Jan. 2, 1968 S. S. BANFALVI ET AL 3,361,875

APPARATUS FOR GENERATING A TELEGRAPH SIGNAL

Filed July 10, 1964 3 Sheets-Sheet 1

INVENTOR
Stephen S. Banfalvi
Harry Hargreaves
BY
James A. Lamb
PATENT AGENT

APPARATUS FOR GENERATING A TELEGRAPH SIGNAL

Filed July 10, 1964 3 Sheets-Sheet 2

INVENTOR
Stephen S. Banfalvi
Harry Hargreaves
BY James A. Laml
PATENT AGENT

APPARATUS FOR GENERATING A TELEGRAPH SIGNAL

Filed July 10, 1964 3 Sheets-Sheet 3

INVENTOR
Stephen S. Banfalvi
Harry Hargreaves
BY
James A. [illegible]
PATENT AGENT

United States Patent Office 3,361,875

Patented Jan. 2, 1968

3,361,875

APPARATUS FOR GENERATING A TELEGRAPH SIGNAL

Stephen S. Banfalvi and Harry Hargreaves, Ottawa, Ontario, Canada, assignors to Computing Devices of Canada Limited, Ottawa, Ontario, Canada Filed July 10, 1964, Ser. No. 381,869
2 Claims. (Cl. 178—17)

ABSTRACT OF THE DISCLOSURE

An apparatus for generating a telegraph pulse code signal having a keyboard with a plurality of groups of switches and a plurality of switches in each group. Each switch has a pulse code generator for generating a particular signal. Each group represents a portion of a message format and the switches in that group represent alternate choices of signals for that portion. The groups of switches and the respective pulse code generators are energized in a predetermined sequence to enable an operator to select a switch in each group as that group is energized to generate signals accurately in a required sequence.

Figures 1, 3, 4, 5:
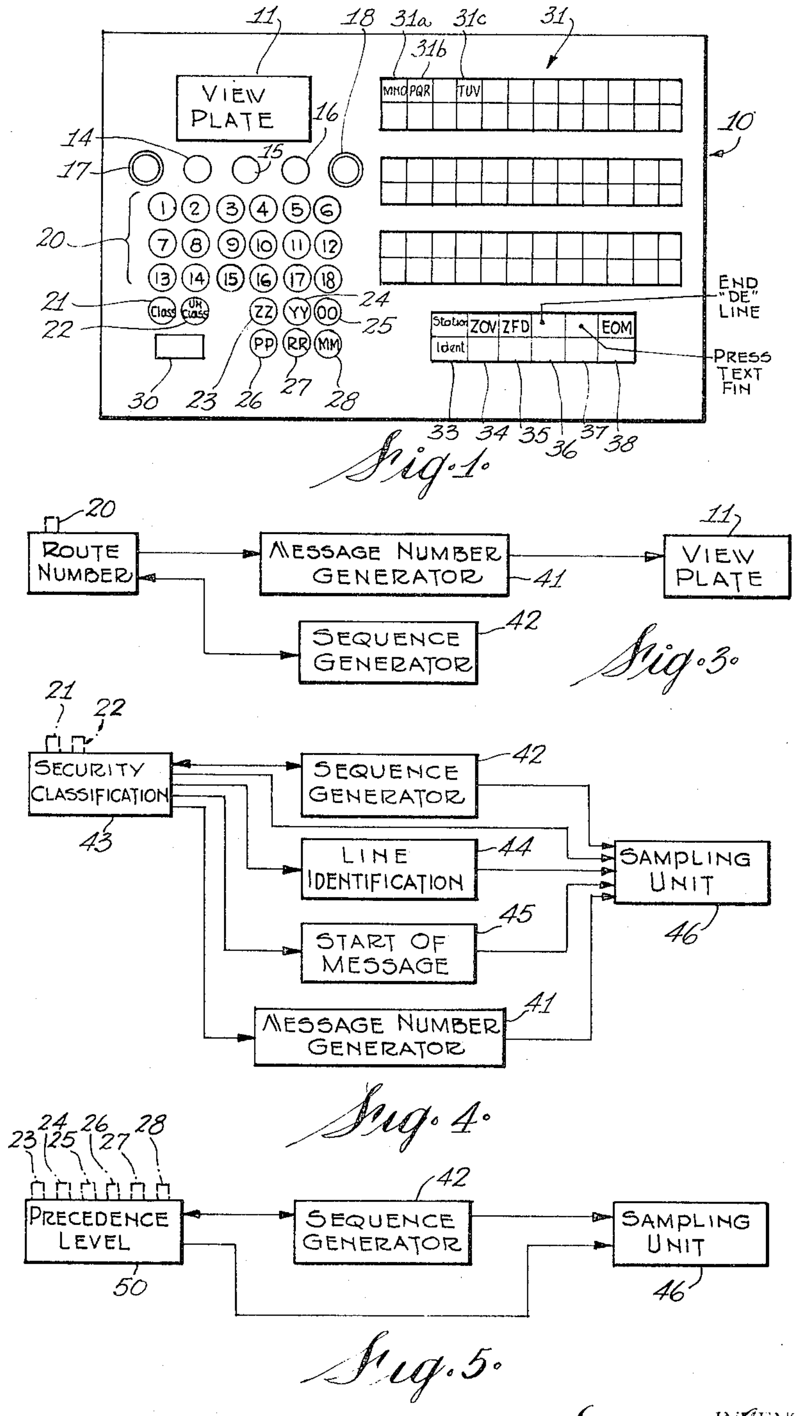

This invention relates to apparatus for use in a code telegraph system, and in particular it relates to apparatus for automatically generating a message format of selected code signals.

Telegraph systems using a code, for example a five unit pulse code, to represent each letter of the alphabet and various other symbols, are well known. These systems are sometimes referred to as "Teletype" systems. Such a system may include telegraph typewriter apparatus which has a keyboard somewhat similar to a typewriter keyboard and which generates a particular series of code pulses in response to actuation of a respective key, and the system may also include telegraph printing apparatus for receiving the code pulse groups and printing the corresponding letter or symbol.

These telegraph systems, which have been known for many years, normally would comprise many stations connected to one or more exchanges, and the exchanges would interconnect the stations according to information in each message to route the message to the required destination station or stations. With the growth of the systems the networks became more complex and it became more and more desirable to use automatic computer controlled exchanges. An automatic exchange may comprise a computer which recognizes various priority and routing letter combinations in the format of a message and directs the transmission of the message accordingly. For example, a message may include in the format portion letter combinations representing the following: start of message; line identifications; message number or sequence number; security warning; precedence level; a number of routing indicators, i.e. a number of signals indicating one or more destinations; the originating station signal; and sometimes other control symbols or instructions. The message text follows the format and an end of message signal follows the text. It will be seen that the message format is very important in a system using an automatic exchange. The computer at the exchange must recognize the individual items in the format and control and route the message accordingly.

Fully automatic exchanges as described above are presently in use but they have not been entirely satisfactory. The automatic exchanges depend on the information or instructions in the message format being in a certain order with each letter or symbol correctly represented. Absolute accuracy in the message format is necessary for satisfactory operation of the system. An error may result in a message being delayed, misrouted or lost. The message, including the format, normally has been typed into the system by an operator and consequently it is possible that an operator error may appear in the format. Extensive operator training programs and message re-checking has reduced operator error to a relatively low level, but the error has not been eliminated. Studies have been made on some systems indicating operator error may be as high as one or two percent. Further reduction by more intensified training and more elaborate supervision is not attractive economically and is not likely to eliminate human error.

The present invention seeks to overcome the problem of operator error in the message format by generating the format signals automatically.

It is therefore an object of this invention to provide apparatus for automatically generating selected telegraph code signals.

It is another object of this invention to provide apparatus for generating selected telegraph code signals in a predetermined sequence.

Figure 9:
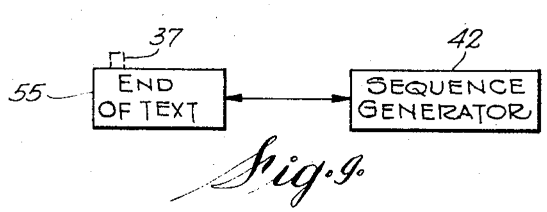
Figure 10:
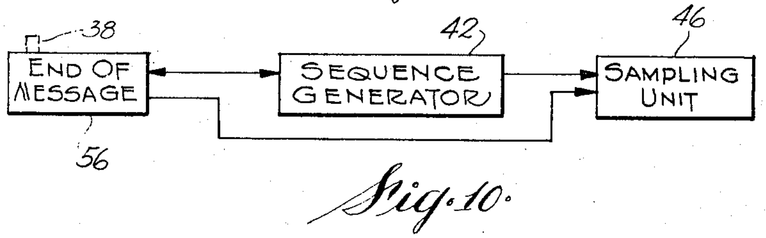
Figure 11:
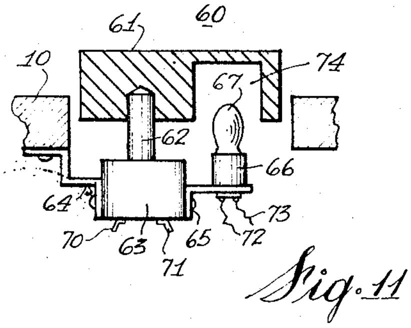

These and other objects and advantages of this invention will be apparent in the following description taken in conjunction with the accompanying drawings, in which FIGURE 1 is a plan view showing a typical control panel for apparatus according to the invention, FIGURE 2 used to simplify the description of the apparatus according to the invention, FIGURES 3 to 10 are portions of the block diagram of FIGURE 2 used to simplify the description of the apparatus, and FIGURE 11 is a sectional view of one type of switch means that may be used in the apparatus of this invention.

In the following description it is assumed the message would include the information or instructions given in the example below and that the information should be in the indicated order. It will be realized that the apparatus as described could be arranged to generate the code signals suitable for any format and in any predetermined order.

Line 1—
: Start of message Line identification, Message number, security warning.

Line 2—
: Precedence level, Routing indicators (the routing indicators indicated destination stations for the message and there may be any number of indicators from one to, say, eighteen—consequently the indicators may require more than one line).

Line 3 (in a printed message this may be line 4 depending on the number of routing indicators)—
: The "DE" line or "from" line which may have the originating station identification, or alternately may have a signal meaning "message misrouted" or "suspected duplicate." There may be provision made for a signal representing the "end of the DE line" where this is required, and this signal would appear or the next line.

The Following Line—
: The message text begins.

Following the Text—
: End of message signal.

The message format consists of the items preceding the text.

Referring now to FIGURE 1, a control panel 10 is shown as would be suitable for the embodiment of the apparatus to be described. The indicators and controls on the control panel 10 will be given briefly and then the manner in which the panel is used will be described to give a better understanding of the invention. Following this a description of the apparatus will be given.

Very generally, the control panel 10 has some display means and a number of controls such as switch means. The switch means normally have a rest condition and an operative condition and are manually operable from the rest condition to the operative condition. More specifically, the control panel 10 has a view plate 11 which is used to display the message number, and in this case it has a capacity of three digits. Reset push buttons 14, 15 and 16 below view plate 11 are used to correct the message number if necessary, or to reset the message number to zero, for example, at the beginning of each day. Two indicator lights 17 and 18 show when the apparatus is "on" and when it is operating to generate a selected signal. A series of push buttons 20, carrying individual numbers 1–18, are capable of individual illumination and are used to prepare the apparatus for the number of routing indicators in a particular message. Push buttons 21 and 22 are to actuate the apparatus to generate a signal indicating security warning or classification, that is they generate a signal to indicate whether the message is classified or unclassified. A group of six push buttons 23–28 carrying individual designations ZZ, YY, OO, PP, RR and MM respectively are for actuating the apparatus to generate a signal representing a selected precedence level. A reset button 30 is provided to reset the apparatus to the beginning if a mistake is discovered, for example, if an incorrect button in a group is pushed. A number of push buttons 31 are provided, each bearing a designation of a desired destination station. These are the routing indicator buttons, The buttons 31 may be illuminated as a group. It will be apparent that the apparatus may be modified and the control panel changed to make a larger selection of routing signals available with a corresponding number of selector buttons 31. A group of three push buttons selectors 33, 34 and 35 are provided to actuate the apparatus to generate a signal representing station identification, message misrouted or suspected duplicate. Next to push button 35 is a button 36 for signalling the end of the DE line, and beside it are buttons 37 and 38 for end of text and end of message signals respectively.

The manner in which the control panel 10 is used will now be described. The pilot or indicator light 17 indicates that the apparatus is "on" and the indicator light 18 indicates that the machine is ready to act, that is, that the proper selections may be made. The light 18 may be illuminated or off to do this. For example, light 18 may flash red while the apparatus is generating a desired signal following the actuation of one of the push button switches and be turned off when the apparatus is ready for the next selection, or light 18 may be off when the apparatus is generating a signal and flash on green when the apparatus is ready for the next selection. If desired, light 17 may be switched off momentarily while the apparatus is generating a selected signal as a further indication of when the apparatus is ready to receive further selections.

When the apparatus is ready at the beginning of a message, only the eighteen push buttons 20 are energized or capable of actuating the apparatus in any way. If any other switch means on the control panel is operated, nothing will happen.

Supposing that the message to be transmitted has three destinations, which means that three routing indicators must appear in the format, then the push button 20 bearing the designation 3 is depressed. The operation of this push button causes several things to happen as follows:

(1) the indicator light 19 indicates momentraily that no further selections may be made until the apparatus has finished responding to the last selection, then light 18 returns to a condition indicating the apparatus is ready for the next selection, and during this time all the switches on the control panel are de-energized, (2) the apparatus is prepared to receive three routing indicators and no more, (3) a message number generator for displaying a message number and for generating a signal representing the message number is advanced one to the new message number, and this new number is displayed on view plate 11, (4) the push button 20 bearing designation 3 is illuminated, (5) all the push buttons 20 are de-energized so that they will actuate nothing if depressed, (6) the next group of switches comprising push button switches 21 and 22 are energized, and (7) the push buttons 21 and 22 are illuminated.

It will be noted that through the operation the apparatus energizes only the group of switches that are next in sequence and indicates this by causing the energized switches to be illuminated. Thus, it is impossible to select and generate a signal out of sequence.

Next, the operator selects either the push button 21 or 22 depending on whether or not the message is classified or unclassified. In this case we will suppose the message is unclassified. The selection or depression of push button switch 22 causes the following:

(1) The indicator 18 indicates no further selections may be made until the apparatus completes the generation of the signals so far selected, and during this time all the switches on the control panel are de-energized.

(2) A start of message generator is actuated to generate a signal indicating start of message, which may be, for example, VZCZC, (3) A line identification generator is actuated to generate a signal representing the line involved and which in this example we may assume to be ABC, (4) The message number generator, which has already been advanced one count is actuated to generate a signal representing the new message number which is already displayed (in this example we may assume the new message number is 123), following this five space signals may be generated in accordance with the particular format requirements of the computer in the exchange, (5) A security classification generator is actuated to generate a signal indicating the selected classification, i.e., unclassified, which may, for example be UU (after this for systems using page type printing apparatus, there may be a line feed and carriage return signal generated to begin a new line. It should be noted here that it is customary in many systems to generate a double carriage return signal rather than a single one whenever a carriage return is required. This provides additional time for the carriage on the printing apparatus to move to its returned position before printing the next group of characters. It will be apparent that the apparatus of this invention could generate either one or two carriage return signals, or any number for that matter, as is required by the system), (6) After the signals have been generated, the push button switches 21 and 22 are de-energized and the lighting means illuminating them is turned off, (7) The next group of switches comprising push button switches 23–28 is energized, and (8) Push buttons 23–28 are illuminated.

The operator may now select the appropriate one of the push buttons 23–28. The operator may, for example, depress the push button 27 for the precedence level signal RR, and this causes the following to take place.

(1) the indicator 18 indicates no further selections may be made until the apparatus completes the generation of the precedence level signal, and during this time all the switches on the control panel are de-energized, (2) a precedence level generator is actuated to generate the selected signal, in this case RR, (3) after the signal is generated, push button switches 23–28 are de-energized and the lighting means illuminating them is turned off, (4) the next group of switches comprising push button switches 31 which are the routing indicator switches are energized, and
(5) the pushbutton switches 31 are illuminated.

It will be recalled that previously the operator actuated the push button designated 3 in the push buttons 20, as three routing indicators would be required, and that the push button remained lighted. Now the operator may select three of the push buttons 31 which have the appropriate routing designation. Suppose for example the three destination stations desired bear the designations RCMNO, RCPQR and RCTUV. The operator depresses the push button switch 31*a* designated RCMNO or perhaps more briefly MNO. This causes the following to take place.

(1) the indicator 18 indicates no further selections may be made until the apparatus completes the generation of the selected routing indicator signal, and during this time all the switches on the control panel are de-energized,
(2) route number switching circuitry and a route number generator are actuated to cause the route indicator signal RCMNO to be generated, and
(3) the push button switch 20 bearing the designation 1 is illuminated, indicating the first of three routing indicators has been selected and the signal generated.

Similarly, the push button 31*b* is depressed, temporarily actuating indicator 18 and its associated circuitry, generating the signal RCPQR, causing illumination of push button 20 bearing the designation 2, and switching off the illumination for the push button 20, designation 1. Also similarly, the push button 31*c* is depressed, temporarily actuating indicator 18 and its associated control circuitry, generating the signal RCTUV, and as this is the third of three routing indicators, de-energizing switches 31 and energizing and lighting the next group of push button switches.

As was previously mentioned, due to limitations of the printing apparatus, the routing indicators may require more than one message line. Consequently the apparatus is arranged to send a carriage return and line feed signal after nine routing indicators have been generated. This may, of course, be altered as is required by the system being used.

The next group of switches includes station identification switch 33, message misrouted switch 34 and suspected duplicate switch 35. For this example the station identification signal may be RCXYZ, the message misrouted signal may be ZOV, and the suspected duplicate signal ZFD. Suppose the operator selects the station identification push button 33, that is the operator depresses the push button switch 33. The following then takes place.

(1) indicator 18 indicates no further selections may be made until the apparatus completes the generation of the selected signal, and during this time all the switches on the control panel 10 are de-energized,
(2) the station identification generator is actuated to cause the signal DE RCXYZ to be generated.
(3) a space signal is generated and the operator may now type into the format any information required of him such as, for example, transmission number, date and time,
(4) after the signal is generated, switches 33, 34 and 35 are de-energized and the lighting means illuminating these switches is turned off,
(5) the next switch, i.e., push button switch 36, is energized, and
(6) push button switch 36 is illuminated.

It will be recalled that the "end of DE line" signal or ZNR signal may or may not be required depending on the network and the computers used at the exchanges in the network. In one system which makes use of a signal denoting "end of the DE line," the signal is used to ensure that the computer at the exchange recognizes the security warning. In this system a signal ZNR (initiated by the "end of DE line" switch 36) is generated on the next message line following the DE line when the message is unclassified. On the other hand, when the message is classified, no signal is generated other than carriage return and line feed signals and the message signal is advanced to the next line. The presence or absence of this ZNR signal provides a security warning, in addition to the security classification signal generated in response to the actuation of switches 21 and 22.

The embodiment of FIGURE 1 is for use in a system where the signal denoting "end of DE line" is used. In the example being described the message is not classified, and the push-button switch 36 has been energized and the push button illuminated. The operator may then operate or depress push button switch 36 and the following takes place.

(1) indicator 18 indicates no further selections may be made until the apparatus completes the generation of the selected signal ZNR, and during this time all the switches on the control panel 10 are de-energized,
(2) the "end of DE line" generator is actuated to generate the signal ZNR and line feed and carriage return signals may precede this signal and follow it,
(3) next, the switch 36 is de-energized and the lighting means which illuminated switch 36 is turned off,
(4) the next switch, i.e. push button switch 37, is energized, and
(5) the push button switch 37 (end of text switch) is illuminated.

If the message had been classified, at the appropriate time switch 21 would have been operated rather than switch 22. The operation of push button switch 21 would have actuated the apparatus in a manner similar to switch 22 except that the apparatus would have been actuated to generate the appropriate signal indicating a classified message, and in addition the "end of DE line" generator (i.e. the ZNR generator) is inhibited or locked out. When the push button 36 is subsequently energized and depressed by the operator the apparatus generates a double carriage return and a line feed, the switch 36 is de-energized and the following switch 37 is energized and illuminated.

The apparatus remains in the condition with the control panel 10 having the push button switch 37 energized and illuminated while the message text is typed into the system by the customary telegraph typewriter apparatus.

It should be noted here that the automatic terminal apparatus of this invention may be connected directly into the network or it may be used to operate a tape perforating apparatus or similar message signal recording apparatus. Normally it is preferred, in both the prior art manual systems and in systems using the apparatus of this invention, to use recording apparatus to record the message signal. The recorded message signal may then be fed into the network system at a constant and efficient speed when required. The use of recording apparatus also permits detection of errors in the message text before the message is transmitted in the network system.

When the message text has been typed, the push button switch 37 is depressed. This switch 37 serves only as an interlock with the end of message (or EOM) switch 38. That is, when switch 37 is depressed the push button switch 38 becomes energized and illuminated while switch 37 is de-energized and the lighting means illuminating it is turned off. This is a safety feature preventing the accidental selection or operation of the "end of message" push button switch 38.

The operator now depresses the push button switch 38 and the following take place.

(1) the indicator 18 indicates no further selections may take place until the apparatus completes the generation of the end of message signal, and during this time all the switches on the control panal 10 are de-energized, (2) a number of line feed signals and carriage return signals may be generated as required by the system, (3) an end of message generator is actuated to generate a signal representing the end of the message, which may for example be NNNN, (4) a number of signals may follow as required by the system, (5) the switch 38 is de-energized and the lighting means which illuminates it is turned off, and (6) the eighteen push buttons 20 are again energized and the apparatus is ready for the next message.

It is believed that the manner in which the control panel 10 is used should now be clear. In the example discussed the message would be

VZCZCABC123 UU
RR RCMNO RCPQR RCTUV
DE RCXYZ
ZNR
MESSAGE TEXT
NNNN

In the above message, the text is typed by the operator. While not shown in the message example above, some information may be typed in following "RCXYZ" if required. The format signals representing computer instructions are all generated by the selection of appropriate push button switches which must be used in the correct sequence. The correct sequence must be followed and the sequence is indicated by lighting of the keys.

As will be apparent from the above message, spaces are generated as required by the computer at the exchange and by the system. The overall format arrangement is generated in accordance with the requirement of the system.

Figure 2:
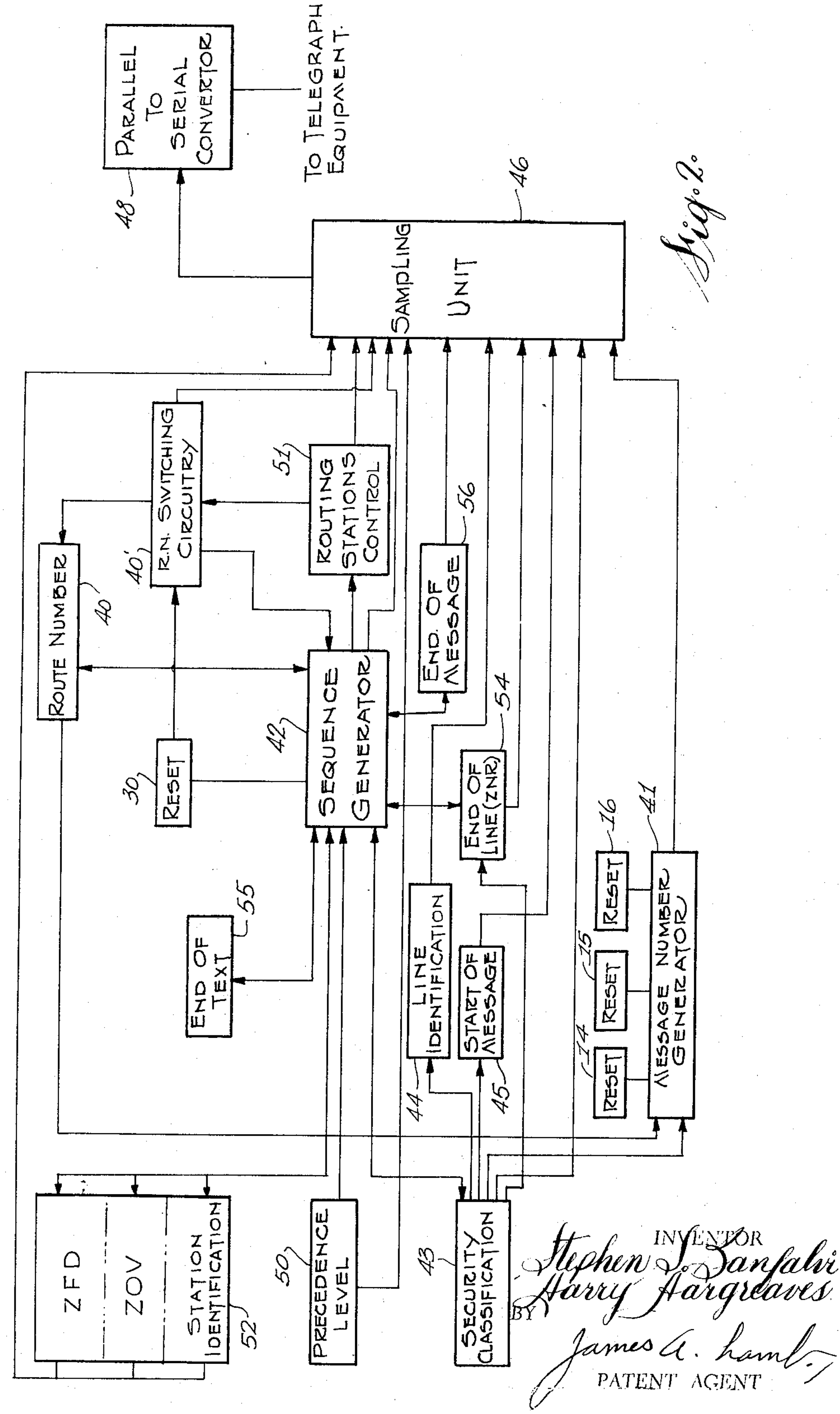

Referring now to FIGURE 2, which is the overall block diagram of the apparatus, and to FIGURES 3–10, which show portions of the FIGURE 2 diagram for ease of description, the apparatus will now be described. Referring first to FIGURE 3 in conjunction with FIGURE 2, there is shown a block 40 representing the route number switch means and the associated route number switching circuitry and which incorporates the eighteen push buttons 20 (FIGURE 1). The route number circuitry 40 is connected to a message number generator 41 and a sequence generator 42. The message number generator 41 is connected to view plate 11 and provides a signal to view plate 11 for displaying a particular message number on view plate 11. The message number generator is also capable of generating a telegraph code signal representing the same message number as will subsequently be described. The sequence generator 42 is a device or circuit having a plurality of modes or conditions. It changes from one mode to the next in a predetermined sequence upon being triggered or actuated. Sequence generator 42 may, for example, comprise a multiple position stepping switch or an equivalent electronic circuit. The sequence generator 42 energizes the different groups of switches in the required sequence and supplies the power to illuminate the individual switches when required, and it is moved to the next mode when the operation in one mode is initiated or complete. It should be noted that the sequence generator 42 may be advanced to its next mode before the pulse code generator in the previous group is finished generating its signal. Thus, for example, the sequence generator may be triggered to its next mode by the operation of the switch means which initiates the pulse code generator. The pulse code generator, once initiated or energized, would have the necessary voltages at the sampling unit which would begin the sampling and pass the signal to the parallel to serial converter. The advance of the sequence generator would not affect this. The sequence generator would be in a mode for energizing the next group of switches, but this would be prevented until the operation was completed. Thus, while the sequence generator is advanced, the next group is not actually energized until the signal generated by the previous operation is completed. The apparatus could, of course, be arranged to delay the advance of the sequence generator until the operation in one mode was completed.

It will be recalled that when the apparatus is ready to begin a new message, the push button switches 20 are energized. That is, the push button switches 20 are energized via sequence generator 42. As the operator depresses one of the push buttons 20, the message number generator is advanced one and the new number is displayed on view plate 11. The route number circuitry which includes a memory circuit and a counting circuit is actuated to "remember" the number of the push button depressed and this push button remains lighted. The sequence generator 42 is then advanced to its next mode as will be described in connection with FIGURE 4.

In FIGURE 4 a security classification generator 43 is connected to the sequence generator 42, a line identification generator 44, a start of message generator 45, the message number generator 41, and a sampling unit 46. The purpose of the generators 41, 43, 44 and 45 is, of course, to generate the appropriate code signal when required. It has been found to be convenient to generate the signals in a parallel form and subsequently convert it to a serial pulse code form as is normally used in commercial communication telegraph code systems. For example, in a five unit code system, each letter or symbol may be represented by five units, that is by five mark or space pulses, and other pulses may be included for control purposes. In the generators of code signals used in this apparatus a single letter or symbol would be represented on five parallel outputs by the presence or absence of a voltage. The parallel outputs would be connected to the sampling unit to apply the five voltages thereto. The sampling unit would sample the five voltages at an appropriate predetermined time in the cycle and would transmit the voltages to the parallel to serial converter. Thus, in FIGURE 4, codes would be applied to sampling unit 46 from generators 45, 44, 41 and 43, and the sampling unit 46 when triggered would sample the codes and send them on to the parallel to serial converter 48 (FIGURE 2).

In FIGURE 4, the sequence generator 42 is in a mode or condition which energizes the security classification generator 43 with its controlling push button switches 21 and 22 and which provides for the illumination of switches 21 and 22. When the operator depresses one of the push button switches 21 or 22, the security classification generator 43 is actuated and a signal is also supplied to generators 45, 44, and 41 to actuate them. Thus the generators 45, 44, 41 and 43 apply their code signals to sampling unit 46, and sampling unit 46 also receives a triggering signal from a sequence generator 42 causing the unit 46 to sample the applied code signals and pass the signals to the parallel to serial converter. When the operation is complete the sequence generator 42 advances to its next mode as shown in FIGURE 5.

Referring now to FIGURE 5, there is shown a precedence level generator 50 which is associated with push buttons 23–28 and which is connected to the sequence generator 42 and the sampling unit 46 as shown. The sequence generator 42 is in a mode or condition energizing precedence level generator 50 and switches 23–28 and also causing switches 23–28 to be illuminated. When an operator depresses one of the push button switches 23–28 the precedence level generator is actuated to generate a signal according to the button pressed and this code signal is applied to the sampling unit 46. The sequence generator 42 then applies a triggering signal to the sampling unit 46 to cause it to sample the applied code signal and transmit it to the parallel to serial converter. When the operation is complete the sequence generator 42 advances to its next mode for generation of the routing indicator signals as described in connection with FIGURE 6.

Figure 6:
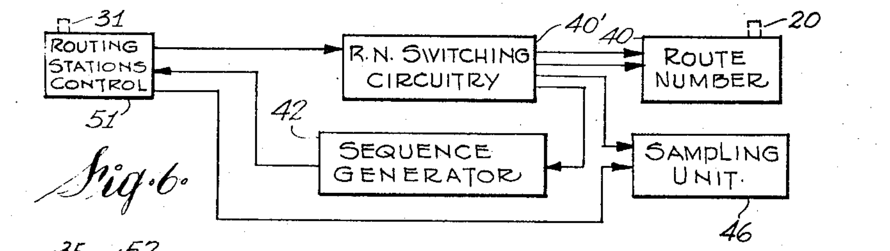

In FIGURE 6 a routing stations control generator 51 having the routing indicator selection push buttons 31 connected therewith is shown. The routing station generator 51 generates a code signal representing a desired destination station in response to selection of a corresponding push button switch 31 by an operator. One convenient arrangement for providing the routing indicator code signals for the destination stations is to have a printed circuit board for each routing indicator signal required. When the appropriate switch is pressed, voltages are applied to the corresponding circuit board which modifies the voltages to provide at a number of parallel outputs either a voltage or no voltage representing mark or space voltages forming the desired code signal. Various other means could be devised to provide code signals in accordance with a selected routing indicator switch.

In FIGURE 6, the routing stations control generator 51 is shown connected to the sampling unit 46 and to the route number switching circuitry 40. The route number switching circuitry (represented by block 40') and the route number switch means (represented by block 40) could be considered as one component block as in FIGURE 3. However, it is indicated as two component blocks in FIGURE 6 to better illustrate the operation. The switching circuitry block 40' is connected to the route number switch means block 40, to the sequence generator 42, and to the sampling unit 46. The sequence generator 42 is connected to the routing stations control generator 51. FIGURE 6 represents the situation when the sequence generator 42 is in a mode or condition applying energized voltages to the routing stations control generator 51 and to the associated routing indicator push button switches 31. In the example used, it will be recalled, three routing indicators were needed in the message and that the push button 20 bearing designation 3 had been pressed to signify this and had remained lighted. When the push button 31 for the first routing indicator signal is depressed, the routing stations control generator generates the required code signal and it is applied to sampling unit 46. A signal is also applied to the counting circuit in the route number switching circuitry 40' which counts that one routing indicator has been generated of three required. The route number switching circuitry 40' energizes the lighting means for push button 20 bearing designation 1 to indicate this on the control panel, and it also supplies a triggering pulse to the sampling unit 46 to cause it to transmit the code signal to the parallel to serial converter. A similar series of events takes place when the second push button 31 is depressed. When the third push button 31 is depressed the required code signal is applied to sampling unit 46 and a signal is applied to the route number switching circuitry 40' as before. The route number switching circuitry 40' compares that the third routing indicator has been generated of three required and then it (*a*) sends a triggering pulse to the sampling unit 46 causing it to sample the code signal applied and send it to the parallel to serial converter, (*b*) de-energize the lighting means on the push button switch 20 designation 3 (and of course the previously illuminated switch 20 bearing designation 2 is no longer illuminated), and (*c*) sends a triggering signal to the sequence generator 42 to advance it to the next mode.

Figure 7:
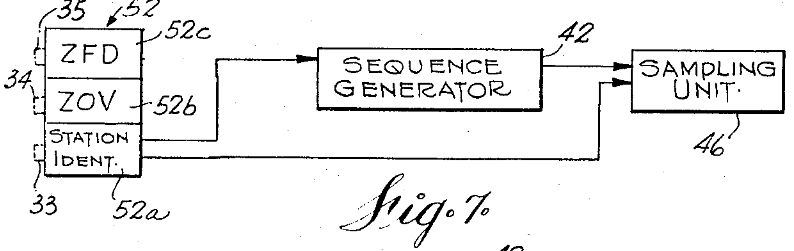

In FIGURE 7 there is shown a block 52 containing three generators—a station identification generator **52*a*, a message misrouted generator 52*b* and a suspected duplicate generator 52*c*. These three generators are associated with and actuated by respective push button switches 33, 34 and 35 to generate the required signal. The block 52 representing these three generators is connected to the sampling unit 46. The sequence generator is connected to block 52 and to the sampling unit 46 as shown. The sequence generator, at the beginning of this part of the sequence, is applying energizing voltages to the generators 52*a*, 52*b* and 52*c* and to the respective push button switches 33, 34 and 35. The operator depresses the appropriate push button, for example as before, push button 33, and the station identification generator generates the code signal representing the originating station. This code signal is applied to sampling unit 46. The sequence generator 42 sends a triggering signal to sampling unit 46 to initiate the sampling action, and then the sequence generator 42** is advanced to the next mode as in FIGURE 8.

Figure 8:
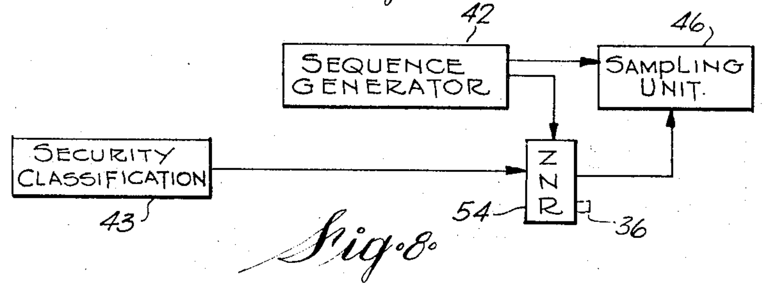

Referring now to FIGURE 8, which depicts the operation of the "end of the DE line," there is shown an "end of DE line" generator 54 (or ZNR generator 54) which is actuated by push button switch 36. There is an input to generator 54 from the security classification generator 43 and from the sequence generator 42. There is an output from generator 54 to the sequence generator 42 and to the sampling unit 46. The sequence generator 42 also has a connection with sampling unit 46. It will be recalled that the operation of the end of DE line generator 54 depends on the security classification and thus on the signal previously generated by the security classification generator. If the message is classified, there is a signal from the security classification generator 43 which inhibits the operation of generator 54. When push button switch 36 is depressed, a double carriage return and line feed signal is generated but no ZNR signal and a signal is applied to the sequence generator 42 advancing it directly to the following mode. On the other hand, if the message is not classified, there is no inhibiting signal applied to generator 54 from generator 43, and the generator 54 with switch 36 is energized by the sequence generator 42. Therefore, when push button switch 36 is depressed the end of DE line generator 54 generates the required signal ZNR and it is applied to sampling unit 46. A triggering signal is then applied to sampling unit 46 causing it to sample the ZNR code signal and pass it to the parallel to serial converter. When the operation is finished, the sequence generator advances to the next mode. The message text may now be typed into the system in the normal manner.

FIGURE 9 shows the mode in which sequence generator 42 remains while the message text is being typed. In this mode the sequence generator 42 energizes an end of text switch means 55 including push button switch 37 and it illuminates push button switch 37. It will be recalled that this is a form of interlock to prevent accidental actuation of an end of message signal. When push button 37 is depressed the sequence generator 42 advances to its next mode as shown in FIGURE 10.

Referring now to FIGURE 10, an end of message generator 56 is connected to sequence generator 42 and sampling unit 46 while the sequence generator 42 is connected to generator 56 and unit 46. The sequence generator 42 applies energizing voltages to the end of message generator 56 and to its controlling push button 38. It also provides lighting for push button 38. When push button 38 is depressed, it actuates end of message generator 56 which generates a code signal representing the end of the message. This code signal is applied to sampling unit 46. The sequence generator applies a triggering signal to sampling unit 46 causing it to sample the applied code signal and to transmit it to the parallel to serial converter. The sequence generator then advances to its rest position for the beginning of the next message.

Referring now to FIGURE 11, there is shown a type of push button switch known generally in the art which is suitable for use in the control panel of the apparatus of this invention. This type of switch might be used, for example, in switches 31 or 33–38, and with minor changes in switches 20–28. This switch is described herein only to ensure a proper understanding of the invention. In FIGURE 11, push button switch 60 has a translucent "button" or handle 61 which may have a rectangular face. The button 61 may have a recess 74 to accommodate a light bulb as shown. The button 61 is fastened to a plunger 62 which extends into the actual switch casing 63 and is retained therein for limited slidable actuating movement. The switch casing 63 may be mounted to control panel 10 by a bracket 64 or other suitable means. Another bracket 65 supports a socket 66 for holding lamp bulb 67. Terminals 70 and 71 protruding from switch casing 63 provide means to connect the switch in the circuit, and terminals 72 and 73, protruding from socket 66, provide means to connect the lamp to the circuit. When connected, pressure on the face of button 61 would depress the button 61 and plunger 62 actuating the switch and making an internal connection between terminals 70 and 71 as is well known. The switch may, of course, have more than two terminals as is required by the particular circuit. When connected in the apparatus of this invention, energizing power is applied to the switch at a desired time and this is indicated by applying power also to terminals 72 and 73 to illuminate button or handle 61.

Speaking generally of the entire apparatus, in the preceding description various functions following the depressing of a push button switch have been described. These functions have been described in some instances as taking place one after the other. It will, however, be apparent to those skilled in the art that some of the functions could take place substantially at the same time, depending on the design of the apparatus.

Apparatus used in commercial telegraph systems operates in that system at a given speed, that is, the pulse code signals normally have a predetermined duration and spacing as do the individual pulses. However, it is possible that different speeds may be used in different systems. The apparatus of this invention may be adapted to any speed and be compatible with any system. The speed of the output signals may be changed by adjusting the speed of the sampling unit and the parallel to serial converter.

The apparatus of this invention may also be used in systems which use code systems other than the standard five unit system by adapting the pulse code generators accordingly. Thus, this apparatus could be used to generate formats with pulse code signals using an eight unit code.

Various other advantages may be derived from the apparatus. For example, a particular message text or portion of a message may recur frequently. A pulse code generator and a corresponding switch may be incorporated to generate the appropriate pulse code signals. The length of the fixed format message that would be generated in this manner would depend on the design of the apparatus.

As another example, it may be desirable to send several separate messages each having the same text. This should not be confused with sending a message to several destinations. When it is desired to send several separate messages, each having it own message number and format, and each having the same text, the following procedure might be used. The format for the first mesage may be generated, the reset button pressed, the message number advanced (the message number is normally not changed automatically when the reset button is pressed), the format for the next message generated, and so on until the required number of formats are generated. Then the message text would follow.

While the invention is most advantageously used in systems having automatic exchanges, it may of course be used in systems having semi-automatic and manually operated exchanges.

It is believed that the preceding description adequately explains the arrangement and apparatus of this invention for generating a telegraph code signal representing a message format.

We claim:

1. Apparatus for generating a telegraph code signal representing a message format, comprising a plurality of switch means each having a rest condition and an operative condition and each having a manually operable handle for changing the switch from its rest condition to its operative condition, a light incorporated in each switch means for illuminating the handle thereof, a pulse code generator for each said switch means connected to a respective switch means and having therewith an energized and a de-energized condition, and in the energized condition thereof being responsive to operation of the respective switch means to its operative condition to generate a predetermined pulse code signal representing a portion of said message format, said plurality of switch means and respective pulse code generators being arranged in a plurality of groups, each group having a plurality of switch means and respective pulse code generators, a sequence generator having a plurality of modes at least equal in number to the number of said plurality of groups and having a triggering signal responsive means operable to advance the sequence generator from one mode to the next in a predetermined sequence, said sequence generator being connected in different ones of said modes to respective different groups of switch means and pulse code generators for energizing the switch means and pulse code generators in the respective group, said sequence generator being connected in different ones of said modes to the lights incorporated in the switch means of the respective group energized by said sequence generator for illuminating the handles of the switch means in the group having the energized switch means and pulse code generators, said switch means providing a triggering signal when energized and moved to its operative condition, the triggering signal responsive means of said sequence generator being connected to said switch means for receiving said triggering signal to advance the signal generator to its next mode.

2. Apparatus for generating a telegraph code signal representing a message format, comprising a control panel, a first group of push button switches mounted on said panel and having a predetermined number of switches therein, each switch having a different numerical indicia from one to said predetermined number, a second group of push button switches mounted on said panel, each having indicia representing a different routing indicator, the push button switches in said first and second groups each having a rest and an operative condition and each having a manually operable button handle for changing the switch from its rest to its operative condition, route number switching means connected to said first group of switches having a memory circuit and a counting circuit each having an energized and a de-energized condition, said memory circuit being responsive in its energized condition to the operation of a push button switch in the first group of switches to its operative condition to store a number corresponding to the operated switch indicia, to retain the number until released and to provide a first triggering signal when the number is stored, a pulse code generator for each switch in said second group of switches, each pulse code generator being connected to a respective switch in said second group and having an energized and a de-energized condition, and in its energized condition being responsive to operation of the respective switch in said second group to its operative condition to generate a pulse code signal representing the routing indicator indicated by the respective switch indicia, said counting circuit being responsive in its energized condition to operation of switches in said second group to count the number of switches operated, to compare the number with the number stored in said memory circuit and to provide a second triggering signal when the numbers are the same, said memory circuit being responsive to said second triggering signal to release the stored number, a sequence generator having at least a first and a second mode and including means to advance said sequence generator from the first to the second mode, said sequence generator in the first mode thereof being connected to said first group of switches and to said memory circuit placing said memory circuit in an energized condition, said means to advance said sequence generator being responsive to said first triggering signal to advance said sequence generator to its second mode, said sequence generator in the second mode thereof being connected to said second group of switches, to said counting circuit and to said pulse code generators placing said counting circuit and pulse code generators in said energized condition, said sequence generator being responsive to said second triggering signal to place said counting circuit and pulse code generators in said de-energized condition.

References Cited

UNITED STATES PATENTS

| | | | |
|---|---|---|---|
| 2,504,999 | 4/1950 | McWhirter, et al. | 340—346 |
| 3,154,640 | 10/1964 | Schierhorst | 178—79 |
| 3,187,321 | 6/1965 | Kameny | 340—365 |

THOMAS A. ROBINSON, *Primary Examiner.*